(12) United States Patent
Sakashita (10) Patent No.: US 10,626,941 B2
(45) Date of Patent: Apr. 21, 2020

(54) DISC BRAKE

(71) Applicant: HITACHI AUTOMOTIVE SYSTEMS, LTD., Ibaraki (JP)

(72) Inventor: Takayasu Sakashita, Tokyo (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 16/310,192

(22) PCT Filed: Jun. 1, 2017

(86) PCT No.: PCT/JP2017/020402
§ 371 (c)(1),
(2) Date: Dec. 14, 2018

(87) PCT Pub. No.: WO2018/003393
PCT Pub. Date: Jan. 4, 2018

(65) Prior Publication Data
US 2019/0249734 A1 Aug. 15, 2019

(30) Foreign Application Priority Data
Jun. 28, 2016 (JP) .................................. 2016-127898

(51) Int. Cl.
*F16D 65/18* (2006.01)
*F16D 65/66* (2006.01)
(Continued)

(52) U.S. Cl.
CPC ............ *F16D 65/66* (2013.01); *B60T 13/586* (2013.01); *B60T 13/74* (2013.01); *F16D 55/22* (2013.01); *F16D 65/18* (2013.01); *B60T 2201/10* (2013.01)

(58) Field of Classification Search
CPC ......... F16D 65/18; F16D 65/66; B60T 13/586
(Continued)

(56) References Cited

U.S. PATENT DOCUMENTS 4,678,065 A * 7/1987 Erben ..................... F16D 65/18
188/106 F
5,829,557 A * 11/1998 Halasy-Wimmer .........................
B60T 13/741
188/162

(Continued)

FOREIGN PATENT DOCUMENTS

JP 2003-83373 3/2003
JP 2012-229798 11/2012
(Continued)

OTHER PUBLICATIONS

International Search Report dated Aug. 29, 2017 in International (PCT) Application No. PCT/JP2017/020402.

*Primary Examiner* — Christopher P Schwartz
(74) *Attorney, Agent, or Firm* — Wenderoth, Lind & Ponack, L.L.P.

(57) ABSTRACT

A disc brake including a piston driving mechanism. The piston driving mechanism includes an input member extended in a cylinder in a protruding direction of a piston, including a threaded portion formed on a circumferential surface of the input member, and configured to be rotated with transmission of torque from an electric motor; a tubular rotation linear motion member including an engaging threaded portion that is engaged with the threaded portion of the input member, and configured to move in an axial direction of the cylinder by rotation of the input member to transmit a torque of the electric motor to the piston; a tubular support member supported on a caliper main body to be not rotatable and placed on an outer side in a radial direction with respect to the rotation linear motion member; and a rolling element placed between the support member and the rotation linear motion member.

5 Claims, 8 Drawing Sheets

(51) Int. Cl.
   *B60T 13/74*      (2006.01)
   *B60T 13/58*      (2006.01)
   *F16D 55/22*      (2006.01)

(58) Field of Classification Search
   USPC ............................... 188/72.6–72.8, 156–164
   See application file for complete search history.

(56) References Cited

U.S. PATENT DOCUMENTS

| | | | | |
|---|---|---|---|---|
| 6,158,558 | A * | 12/2000 | Bill .................... | F16D 65/18 188/162 |
| 6,315,086 | B1 * | 11/2001 | Schmitt ................ | B60T 13/741 188/158 |
| 6,318,516 | B1 * | 11/2001 | Zernickel ............. | B60T 13/741 188/157 |
| 7,370,896 | B2 * | 5/2008 | Anderson ............ | B25J 15/0009 294/106 |
| 10,393,245 | B2 * | 8/2019 | Pasquet .................. | F16D 65/18 |
| 2012/0261220 | A1 * | 10/2012 | Sakashita ............... | F16D 65/18 188/72.6 |

FOREIGN PATENT DOCUMENTS

| | | |
|---|---|---|
| JP | 2014-214830 | 11/2014 |
| JP | 2015-56999 | 3/2015 |

\* cited by examiner

DISC BRAKE

TECHNICAL FIELD

The present invention relates to a disc brake used to brake a vehicle.

BACKGROUND ART

A conventional disc brake is equipped with a parking brake mechanism configured to thrust a piston and keep the piston at a braking position at the timing of activating a parking brake or the like. The parking brake mechanism includes a ball and ramp mechanism and a screw mechanism. The disc brake employs a configuration to operate the ball and ramp mechanism and the screw mechanism by rotation of an electric motor, so as to move the piston to the braking position and keep the piston at the braking position by the screw mechanism (refer to Patent Literature 1).

CITATION LIST

Patent Literature

PTL 1: JP 2012-229798A

SUMMARY OF INVENTION

Technical Problem

The disc brake described in Patent Literature 1 is configured to cause the ball and ramp mechanism and the screw mechanism to generate thrust and keep the piston at the braking position at the time of activating the parking brake. The disc brake is additionally configured to adjust the gap between the piston and a nut by relative rotation of the screw mechanism between the nut and a push rod in an initial stage of parking brake application. This configuration further includes a spring clutch and a wave clip provided to change over the operations of the ball and rap mechanism and the screw mechanism according to the rotational torque from the electric motor. The disc brake has a large number of components to achieve this configuration.

An object of the present invention is to provide a disc brake that has the simpler configuration with the less number of components and enhances the reliability.

Solution to Problem

A disc brake according to one embodiment of the present invention includes a piston configured to move one of a pair of pads, which are placed across a rotor on respective sides in an axial direction of the rotor, in the axial direction of the rotor; a caliper main body including a cylinder in which the piston is placed in a protrudable manner; an electric motor provided on the caliper main body; and a piston driving mechanism provided in the cylinder of the caliper main body and configured to drive the piston. The piston driving mechanism includes an input member placed to be extended in the cylinder in a protruding direction of the piston, including a threaded portion formed on a circumferential surface of the input member, and configured to be rotated with transmission of a torque from the electric motor; a tubular rotation linear motion member including an engaging threaded portion engaged with the threaded portion of the input member, and configured to move in an axial direction of the cylinder by rotation of the input member to transmit a torque of the electric motor to the piston; a tubular support member in supported on the caliper main body to be not rotatable and placed on an outer side in a radial direction with respect to the rotation linear motion member; and a rolling element placed between the support member and the rotation linear motion member to be engaged with the support member and the rotation linear motion member, and configured to, when the rotation linear motion member is rotated by rotation of the input member, apply a rotational resistance to the rotation linear motion member and linearly move the rotation linear motion member while rotating the rotation linear motion member relative to the input member.

A disc brake according to another embodiment of the present invention includes a caliper main body including a piston configured to press a pad against a rotor, and a cylinder bore formed such that the piston is movably placed therein; an electric motor mounted to the caliper main body; and a piston driving mechanism provided in the cylinder bore and configured to drive the piston by a torque of the electric motor. The piston driving mechanism includes two screw mechanisms provided on an inner side and on an outer side in a radial direction of the cylinder bore and configured to convert rotation by the torque of the electric motor into linear motion. The screw mechanism on the outer side has a higher mechanical efficiency than the screw mechanism on the inner side.

The embodiments of the present invention provide the disc brake that has the simpler configuration with the less number of components and enhances the reliability.

DESCRIPTION OF EMBODIMENTS

Embodiments are described in detail with reference to FIGS. 1 to 8.

The following describes disc brakes 1a to 1c according to first to third embodiments. The disc brake 1a according to the first embodiment is described first with reference to FIGS. 1 to 4.

Figure 1:
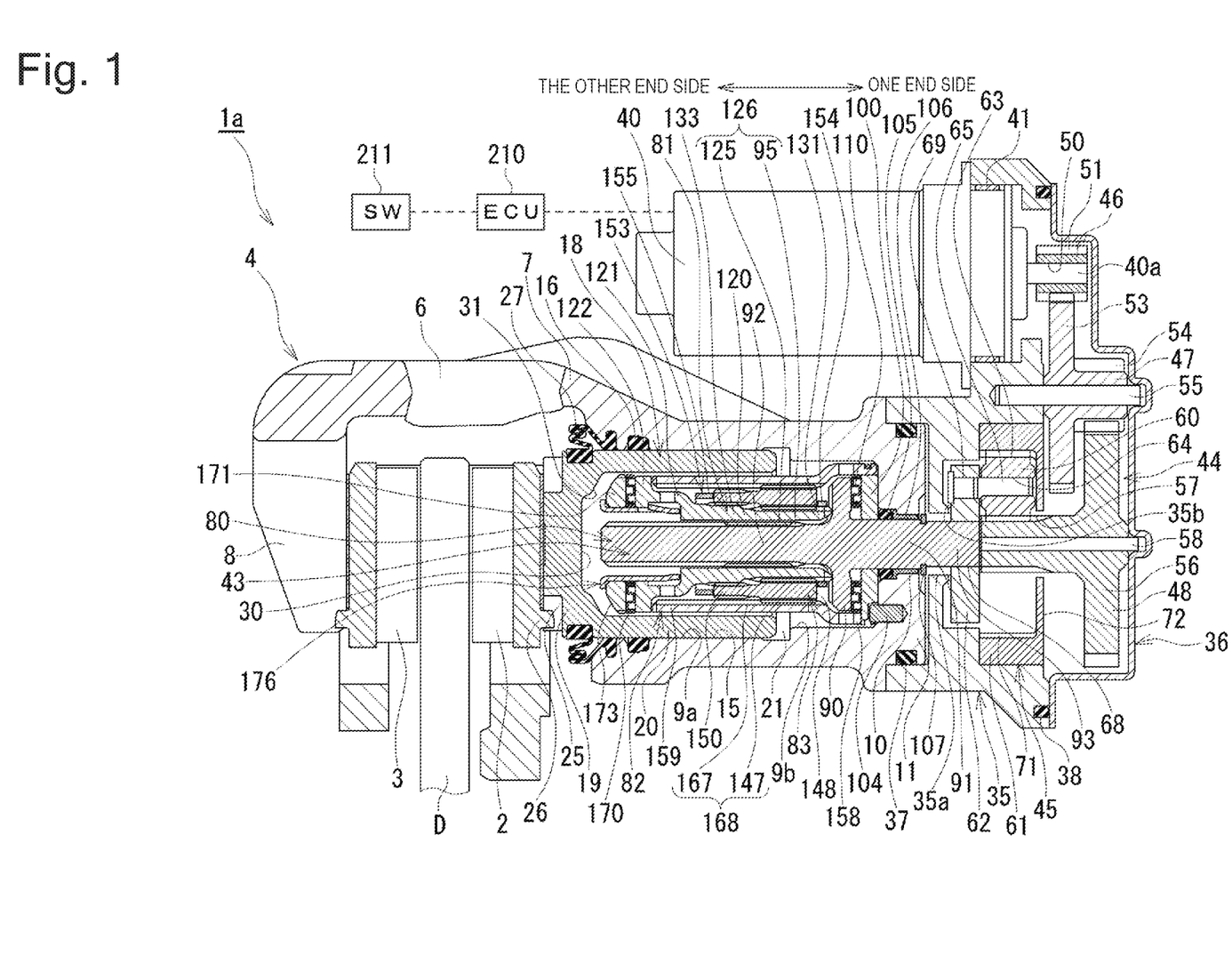
FIG. 1 is a sectional view illustrating a disc brake according to a first embodiment.

As shown in FIG. 1, the disc brake 1a according to the first embodiment includes a pair of inner brake pad 2 and outer brake pad 3 placed on respective sides in an axial direction across a disk rotor D mounted to a rotational portion of a vehicle, and a caliper 4. This disc brake 1a is configured as a floating caliper type. The pair of inner brake pad 2 and outer brake pad 3 and the caliper 4 are supported by a bracket (not shown) fixed to a non-rotational portion such as a steering knuckle of the vehicle to be movable in the axial direction of the disk rotor D. In the description below, as a matter of convenience, the right side of the drawings is called one end side, and the left side of the drawings is called the other end side.

A caliper main body 6 that is a main component of the caliper 4 includes a cylinder portion 7 placed on a base end side opposed to the inner brake pad 2 on the inner side of the vehicle, and a claw portion 8 placed on a leading end side opposed to the outer brake pad 3 on the outer side of the vehicle. The cylinder portion 7 includes a bottomed cylinder 15 formed such that its inner brake pad 2-side is open to form a larger-diameter opening 9a and its opposite side is closed by a bottom wall 11 having a hole 10. The bottom wall 11-side in the cylinder 15 has a smaller-diameter opening 9b formed to be continuous with the larger-diameter opening 9a and to have a smaller diameter than the diameter of the larger-diameter opening 9a. A piston seal 16 is placed on an inner wall surface of the larger-diameter opening 9a of the cylinder 15.

Figure 2:
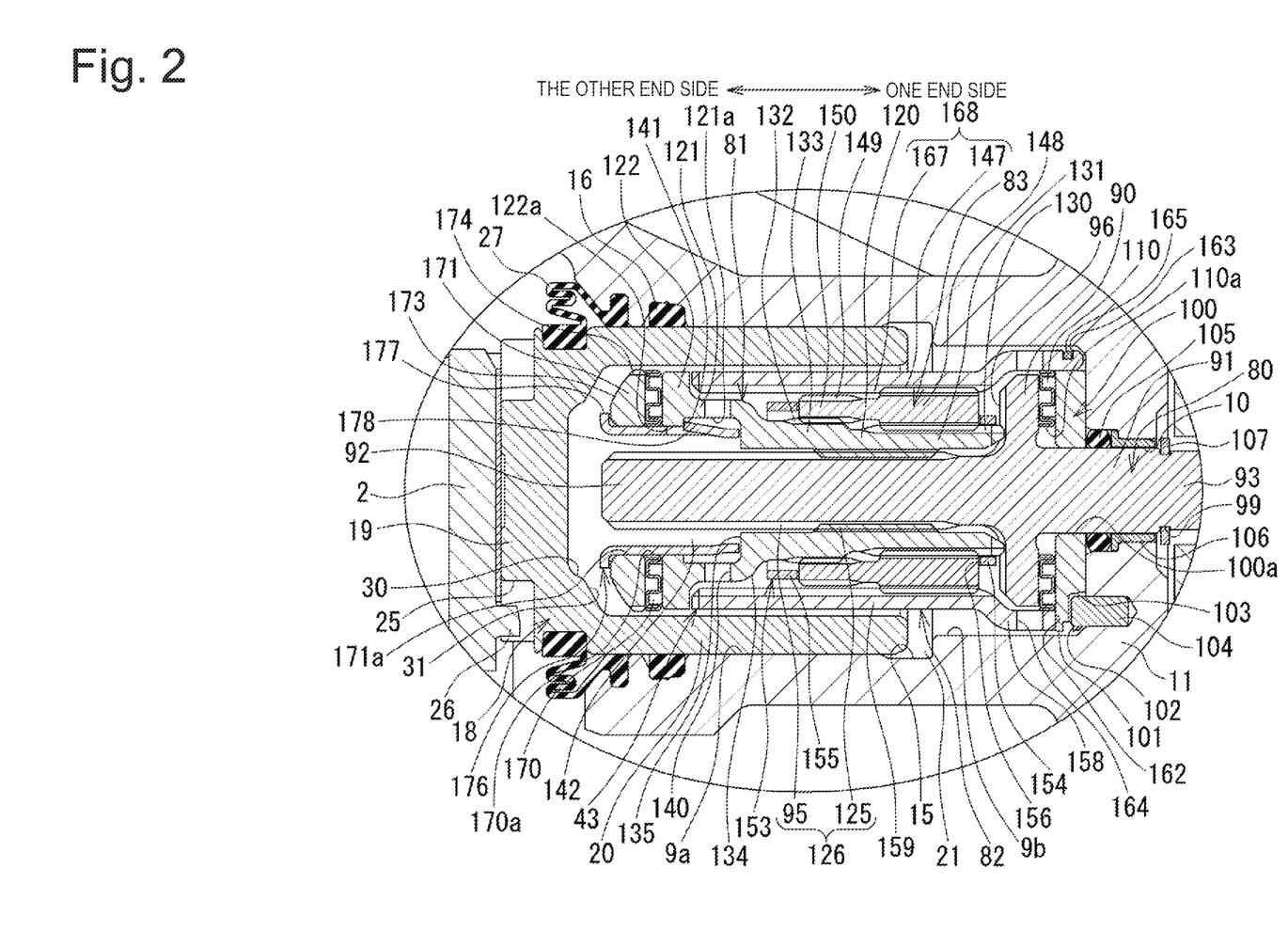
FIG. 2 is an enlarged sectional view illustrating a piston driving mechanism employed for the disc brake according to the first embodiment.

As shown in FIG. 1 and FIG. 2, the piston 18 is formed in a bottomed cup shape and includes a bottom portion 19 and a cylindrical portion 20. The piston 18 is placed in the cylinder 15, such that its bottom portion 19 is opposed to the inner brake pad 2. The piston 18 is internally arranged in the larger-diameter opening 9a of the cylinder 15 to be in contact with the piston seal 16 and to be movable in the axial direction. A hydraulic pressure chamber 21 is defined by the piston seal 16 between this piston 18 and the bottom wall 11 of the cylinder 15. A hydraulic pressure is supplied from a non-illustrated hydraulic pressure source, such as a master cylinder or a hydraulic control unit, via a non-illustrated port provided in the cylinder portion 7 to the hydraulic pressure chamber 21.

A concave 25 is provided on an outer circumferential side of the other end face, which is opposed to the inner brake pad 2, of the bottom portion 19 of the piston 18. A convex 26 formed on a rear face of the inner brake pad 2 is engaged with the concave 25. This engagement locks the piston 18 relative to the cylinder 15 and thus to the caliper main body 6 not to rotate. A dust boot 27 is provided between an outer wall surface of the bottom portion 19 of the piston 18 and the inner wall surface of the larger-diameter opening 9a of the cylinder 15 to prevent foreign substances from entering the cylinder 15. One end face, which is opposed to a piston driving mechanism 43, of the bottom portion 19 of the piston 18 is provided with a circular recessed portion 30 formed in a center region in its radial direction and a ring-shaped sloped portion 31 formed to be continuous with one end of the circular recessed portion 30 and to be extended with expanding the diameter toward an inner wall surface of the piston 18.

As shown in FIG. 1, a housing 35 is mounted air-tightly to the bottom wall 11-side of the cylinder 15. A cover 36 is mounted air-tightly to one end opening of the housing 35. A seal member 37 is provided to keep the air tightness of the housing 35 relative to the cylinder portion 7. A seal member 38 is provided to keep the air tightness of the housing 35 relative to the cover 36. An electric motor 40 is hermetically mounted via a seal member 41 to the housing 35 to be arrayed with the caliper main body 6. According to the embodiment, the electric motor 40 is placed outside of the housing 35. According to a modification, the housing 35 may be formed to cover the electric motor 40, and the electric motor 40 may be placed inside the housing 35. This modification does not need the seal member 41 and reduces the number of assembling steps. According to another modification, the housing 35 and the cover 36 may be welded to and joined with each other. This modification does not need the seal member 38 and reduces the number of assembling steps.

The caliper main body 6 is provided with a spur gear multistage speed reducer 44 and a planetary gear speed reducer 45 which are configured to enhance rotation by the electric motor 40, and with the piston driving mechanism 43 configured to convert the rotational motion of the spur gear multistage speed reducer 44 and the planetary gear speed reducer 45 into linear motion and thereby drive the piston 18.

The spur gear multistage speed reducer 44 and the planetary gear speed reducer 45 are placed in the housing 35. The spur gear multistage speed reducer 44 includes a pinion gear 46, a first reduction gear 47 and a second reduction gear 48. The pinion gear 46 is formed in a cylindrical shape and includes a hole 50 which a rotating shaft 40a of the electric motor 40 is press-fit in and fixed to, and a gear 51 formed on an outer wall surface. The first reduction gear 47 includes a larger-diameter main wheel 53 meshed with the gear 51 of the pinion gear 46, and a smaller-diameter pinion 54 formed integrally with the main wheel 53 to be extended in the axial direction from the main wheel 53. This first reduction gear 47 has one end supported by the housing 35 and the other end supported rotatably by a shaft 55 that is supported by the cover 36. The second reduction gear 48 includes a larger-diameter main wheel 56 meshed with the pinion 54 of the first reduction gear 47, and a smaller-diameter sun gear 57 formed integrally with the main wheel 56 to be extended in the axial direction from the main wheel 56. The sun gear 57 forms part of the planetary gear speed reducer 45. This second reduction gear 48 is rotatably supported by a shaft 58 that is supported by the cover 36.

The planetary gear speed reducer 45 includes the sun gear 57, a plurality of (for example, three) planetary gears 60, an internal gear 61, and a carrier 62. The planetary gear 60 includes a gear 63 meshed with the sun gear 57 of the second reduction gear 48, and a hole 64 through which a pin 65 provided to stand from the carrier 62 is inserted. The three planetary gears 60 are arranged at equal intervals on a circumference of the carrier 62.

The carrier 62 is formed in a disk shape. A polygonal hole 68 is formed on the center in the radial direction of the carrier 62. A polygonal shaft portion 93 of a spindle rod 80 is fitted in the polygonal hole 68. Fitting the polygonal shaft portion 93 of the spindle rod 80 in the polygonal hole 68 enables rotational torque to be transmitted between the carrier 62 and the spindle rod 80. A plurality of pin holes 69 are formed on an outer circumferential side of the carrier 62. Pins 65 which rotatably support the respective planetary gears 60 are press-fitted in and fixed to the respective pin holes 69. Motions in the axial direction of the carrier 62 and the respective planetary gears 60 are restricted by a wall surface 35b that is protruded toward one end side from periphery of an opening 35a of the housing 35 and by a ring-shaped wall portion 72 integrally provided on the second reduction gear 48-side of the internal gear 61. According to the embodiment, the rotation relative to the spindle rod 80 is restricted by the polygonal hole 68 provided in the carrier 62. A modification may employ a mechanism element such as a spline or a key that can transmit the rotational torque.

The internal gear 61 has internal teeth 71 meshed with the gears 63 of the respectively planetary gears 60, and a ring-shaped wall portion 72 provided integrally on the second reduction gear 48-side to be continuous from the internal teeth 71 and to restrict the motion in the axial direction of the planetary gear 60. The internal gear 61 is press-fitted in and fixed to the housing 35.

According to the embodiment, the spur gear multistage speed reducer 44 and the planetary gear speed reducer 45 are provided as speed reduction mechanisms that enhance the rotation by the electric motor 40, in order to obtain a rotational torque of driving the piston 18. Either one or both of the speed reduction mechanisms may be omitted, as long as a modified configuration ensures output of the rotational torque.

The piston driving mechanism 43 is configured to convert the rotational motion of the spur gear multistage speed reducer 44 and the planetary gear speed reducer 45, i.e., rotation of the electric motor 40, into motion in a linear direction (hereinafter referred to as linear motion) and apply thrust to the piston 18. The piston driving mechanism 43 also serves to hold the piston 18 at a braking position after driving the piston 18. As shown in FIG. 1 and FIG. 2, the piston driving mechanism 43 is provided between the bottom wall 11 of the cylinder 15 and the bottom portion 19 of the piston 18. The piston driving mechanism 43 includes a spindle rod 80 serving as an input member or a shaft member, an adjuster nut 81 serving as a rotation linear motion member or a tubular member, a ring shaft 82 serving as a support member or a fixation member, and a plurality of planetary rods 83 serving as rolling elements or rolling shafts. The piston driving mechanism 43 also includes an inner screw mechanism (first screw engaging portion 126) including the spindle rod 80 and the adjuster nut 81, and an outer screw mechanism (second screw engaging portion 168) including the adjuster nut 81, the ring shaft 82 and the plurality of planetary rods 83.

Figure 3:
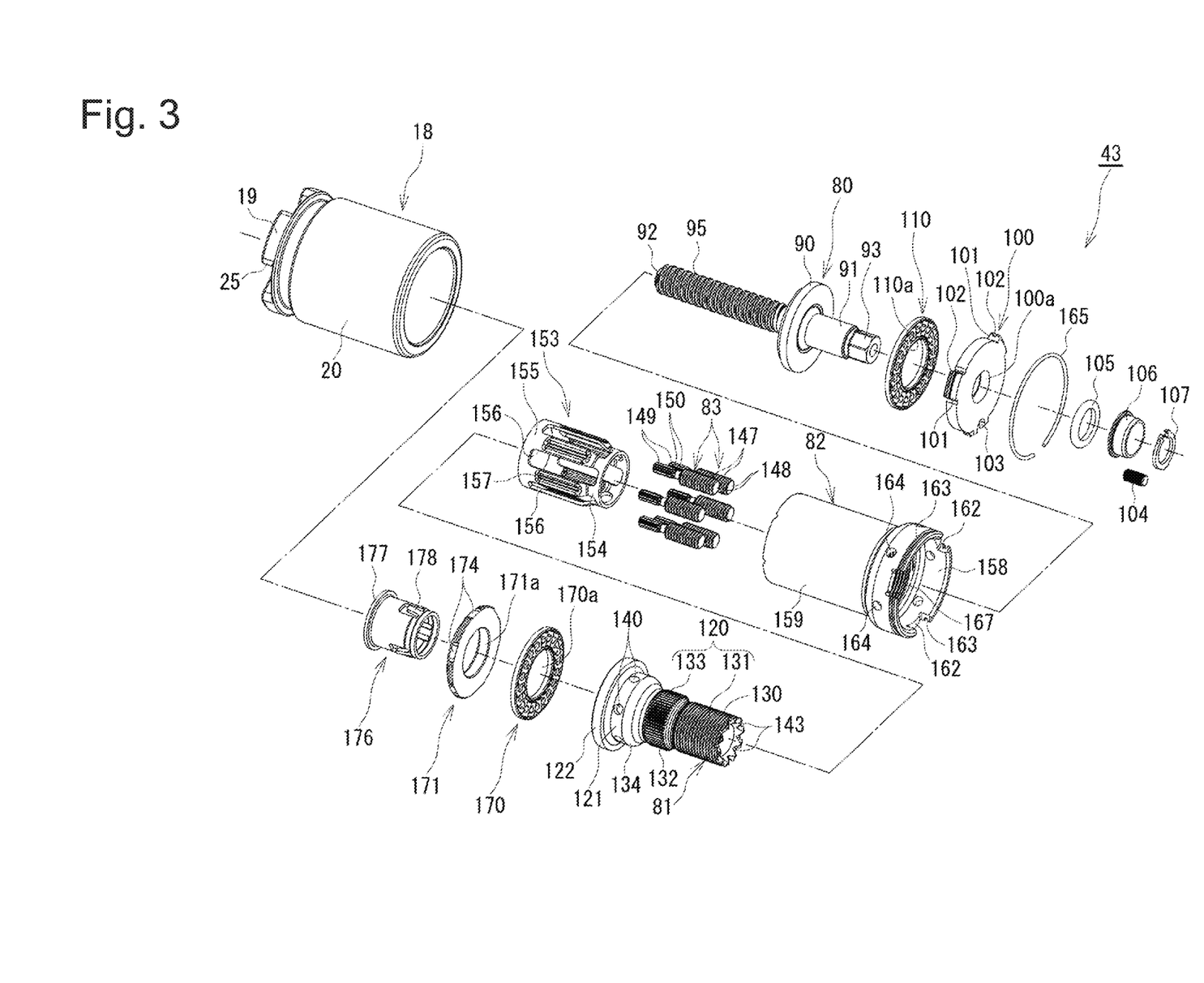
FIG. 3 is an exploded perspective view illustrating the piston driving mechanism employed for the disc brake according to the first embodiment.

As shown in FIGS. 1 to 3, the spindle rod 80 is rotatably supported in the cylinder 15, and the rotational motion of the electric motor 40 is transmitted to the spindle rod 80 via the spur gear multistage speed reducer 44 and the planetary gear speed reducer 45. The spindle rod 80 includes a disk portion 90 that has an outer diameter smaller than the inner diameter of a larger-diameter ring shaft portion 158 of the ring shaft 82 described later, a torque transmission shaft portion 91 that is extended integrally toward one end side from a center region in the radial direction of the disk portion 90, and a screw shaft portion 92 that is extended integrally toward the other end side from the center region in the radial direction of the disk portion 90. A leading end of the torque transmission shaft portion 91 forms the polygonal shaft portion 93 that is chamfered in a polygonal shape. An annular groove 99 is formed between the torque transmission shaft portion 91 and the polygonal shaft portion 93. A male threaded portion 95 is formed over the substantially entire area in the axial direction on an outer wall surface of the screw shaft portion 92. A plurality of locking projections 96 are formed at intervals along a circumferential direction around the screw shaft portion 92 on the other end face of the disk portion 90 of the spindle rod 80. The respective locking projections 96 are extended radially.

A ring-shaped base plate 100 is placed to abut on the bottom wall 11 of the cylinder 15. A insertion hole 100a is formed in a center region in the radial direction of the base plate 100. The torque transmission shaft portion 91 of the spindle rod 80 is inserted through the insertion hole 100a. A plurality of rotation restricting projections 101 are arranged at intervals in the circumferential direction on an outer periphery of the base plate 100 to be protruded outward in the radial direction. A receiving groove 102 extended in the circumferential direction is formed in an outer wall surface of each of the rotation restricting projections 101. An engagement recess 103 is formed in either one end face of each of the rotation restricting projections 101. A pin member 104 is fixed to a bottom face of the cylinder 15 to be protruded in the cylinder 15.

The pin member 104 is engaged with the engagement recess 103 provided in the rotation restricting projection 101 of the base plate 100. This engagement restricts rotation of the base plate 100 relative to the bottom wall 11 of the cylinder 15. The torque transmission shaft portion 91 of the spindle rod 80 is inserted through a insertion hole 110a of a first thrust bearing 110 described later, the insertion hole 100a of the base plate 100, and the hole 10 provided in the bottom wall 11 of the cylinder 15. The polygonal shaft portion 93 is inserted through the opening 35a of the housing 35 and is fitted in the polygonal hole 68 of the carrier 62. According to the embodiment, as shown in FIG. 3, the polygonal shaft portion 93 is formed as a hexagonal shaft portion, and the polygonal hole 68 is formed as a hexagonal hole. The polygonal shaft portion 93 may not be necessarily formed in a hexagonal shape but may be formed in another polygonal shape, such as triangular, rectangular, pentagonal, heptagonal, or octagonal or may be in a double chamfered shape.

A seal member 105 and a sleeve 106 are provided between an outer wall surface of the torque transmission shaft portion 91 of the spindle rod 80 and an inner wall surface of the hole 10 of the bottom wall 11 of the cylinder 15. The sleeve 106 is placed on one end side, and the seal member 105 is placed on the other end side. The seal member 105 and the sleeve 106 are provided to keep the liquid tightness in the hydraulic pressure chamber 21 and to rotatably support the torque transmission shaft portion 91 of the spindle rod 80. A retaining ring 107 is fitted in the annular groove 99 of the spindle rod 80. The retaining ring 107 restricts the motion of the spindle rod 80 in the axial direction in the cylinder 15. The ring-shaped first thrust bearing 110 having the insertion hole 110a is placed between the base plate 100 and the disk portion 90 of the spindle rod 80. The disk portion 90 of the spindle rod 80 is rotatably held on the base plate 100 by the first thrust bearing 110. The first thrust bearing 110 is supported to have its motion in the radial direction restricted by the larger-diameter ring shaft portion 158 of the ring shaft 82 described later. According to a modification, the torque transmission shaft portion 91 of the spindle rod 80 may be provided with a larger-diameter shaft portion having the diameter approximately identical to the inner diameter of the insertion hole 110a of the first thrust bearing 110, and the first thrust bearing 110 may be supported to have its motion in the radial direction restricted by this larger-diameter shaft portion.

The adjuster nut 81 is screwed to the male threaded portion 95 of the screw shaft portion 92 of the spindle rod 80. The adjuster nut 81 includes a nut portion 120 located on one end side to be screwed to the spindle rod 80, a middle tubular portion 121 in a cylindrical shape integrally provided to be continuous from the nut portion 120 toward the other end side, and a ring-shaped pusher portion 122 integrally provided to be continuous from the middle tubular portion 121 toward the other end side. A female threaded portion 125 serving as an engagement portion is formed in an inner wall surface of the nut portion 120 to be screwed to the male threaded portion 95 of the spindle rod 80.

The first screw engaging portion (inner screw mechanism) 126 between the male threaded portion 95 of the spindle rod 80 and the female threaded portion 125 of the nut portion 120 of the adjuster nut 81 is configured as an irreversible screw engaging portion having a reverse efficiency equal to or lower than zero not to rotate the spindle rod 80 by a load in the axial direction transmitted from the piston 18 to the adjuster nut 81. In other words, the first screw engaging portion 126 serves as a screw mechanism to move the piston 18 by rotation of the electric motor 40 and to hold the piston 18 at a moved position when rotation of the electric motor 40 is stopped. The nut portion 120 includes a first sun shaft portion 131 with a plurality of annular grooves 130 that are formed in an outer wall surface on one end side and that are arranged in the axial direction, and a second sun shaft portion 133 with a plurality of longitudinal grooves 132 that are formed in an outer wall surface on the other end side, that are extended along the axial direction, and that are arranged in the circumferential direction. The second sun shaft portion 133 is formed to have an outer diameter that is larger than the outer diameter of the first sun shaft portion 131.

The middle tubular portion 121 is formed to have an outer diameter that is larger than the outer diameter of the second sun shaft portion 133. An outer wall surface between the middle tubular portion 121 and the nut portion 120 forms a curved surface 134 that is tapered toward one end. The middle tubular portion 121 has a insertion hole 121a formed to have an inner diameter that is larger than the inner diameter of the female threaded portion 125. An annular wall surface 135 is accordingly formed between an inner wall surface of the insertion hole 121a of the middle tubular portion 121 and an inner wall surface of the nut portion 120. A plurality of flow holes 140 are arranged at intervals in the circumferential direction to be pierced along the radial direction in a circumferential wall portion of the middle tubular portion 121. The flow holes 140 are formed in a generally circular shape. The respective flow holes 140 are provided for the flow of brake fluid. The pusher portion 122 is formed to have an outer diameter that is larger than the outer diameter of the middle tubular portion 121.

The pusher portion 122 has a insertion hole 122a formed to have an inner diameter that is smaller than the inner diameter of the insertion hole 121a of the middle tubular portion 121. An annular step 141 is accordingly formed between the inner wall surface of the insertion hole 121a of the middle tubular portion 121 and an inner wall surface of the insertion hole 122a of the pusher portion 122. Annular space 142 is formed between the respective inner wall surfaces of the insertion hole 121a of the middle tubular portion 121 and the insertion hole 122a of the pusher portion 122 and an outer wall surface of the screw shaft portion 92 (male threaded portion 95) of the spindle rod 80. A plurality of locking concaves 143 are formed in one end face of the adjuster nut 81, more specifically in one end face of the nut portion 120, to be arranged at intervals in the circumferential direction. The respective locking projections 96 extended radially and provided on the other end face of the disk portion 90 of the spindle rod 80 are engaged with the respective locking concaves 143 provided on one end face of the adjuster nut 81. This configuration suppresses the male threaded portion 95 of the spindle rod 80 from being excessively screwed in the female threaded portion 125 of the adjuster nut 81.

A plurality of planetary rods 83 are provided around the nut portion 120 of the adjuster nut 81. According to the embodiment, six planetary rods 83 are provided. Each of the planetary rods 83 includes a first planetary rod portion 148 with a plurality of annular grooves 147 that are formed in an outer wall surface on one end side and that are arranged in the axial direction, and a second planetary rod portion 150 with a plurality of longitudinal grooves 149 that are formed in an outer wall surface on the other end side, that are extended along the axial direction, and that are arranged in the circumferential direction. The first planetary rod portion 148 is formed to have an outer diameter that is larger than the outer diameter of the second planetary rod portion 150.

The respective annular grooves 147 of the first planetary rod portions 148 of the respective planetary rods 83 are engaged with the respective annular grooves 130 of the first sun shaft portion 131 of the adjuster nut 81 (nut portion 120), whereas the respective longitudinal grooves 149 of the second planetary rod portions 150 of the respective planetary rods 83 are gear-meshed with the respective longitudinal grooves 132 of the second sun shaft portion 133 of the adjuster nut 81 (nut portion 120). Engagement between the respective annular grooves 147 of the first planetary rod portions 148 of the respective planetary rods 83 and the respective annular grooves 130 of the first sun shaft portion 131 of the adjuster nut 81 restricts motions of the adjuster nut 81 and the planetary rods 83 relative to each other in the axial direction. Gear mesh between the respective longitudinal grooves 149 of the second planetary rod portions 150 of the respective planetary rods 83 and the respective longitudinal grooves 132 of the second sun shaft portion 133 of the adjuster nut 81 causes rotational torque to be transmitted from the adjuster nut 81 to the respective planetary rods 83. This configuration enables each of the planetary rods 83 to revolve around the first sun shaft portion 131 and the second sun shaft portion 133 of the adjuster nut 81 while rotating on its own axis, accompanied with rotation of the adjuster nut 81.

A cage 153 is provided to rotatably support the respective planetary rods 83. The cage 153 is formed in a cylindrical shape. The cage 153 includes a smaller-diameter cage portion 154 located on one end side and a larger-diameter cage portion 155 located on the other end side to be continuous from the smaller-diameter cage portion 154. Abutting an inner wall surface of the smaller-diameter cage portion 154 on an outer wall surface of the first sun shaft portion 131 of the adjuster nut 81 restricts the motion of the cage 153 in the radial direction and rotatably supports the cage 153. The larger-diameter cage portion 155 is formed to have an outer diameter that is smaller than the outer diameter of the middle tubular portion 121 of the adjuster nut 81. A plurality of support holes 156 are formed in a circumferential wall portion of the larger-diameter cage portion 155 to be arranged at intervals in the circumferential direction. The number of the support holes 156 formed corresponds to the number of planetary rods 83. The support hole 156 is formed in a rectangular shape that is elongated in the axial direction. The distance of each support hole 156 along the axial direction is approximately equal to the full length of the planetary rod 83, and the distance of each support hole 156 along the circumferential direction is approximately equal to the outer diameter of the first planetary rod portion 148 of the planetary rod 83. This configuration causes the respective planetary rods 83 to be rotatably supported in the respective support holes 156. Axial direction extended portions 157 are provided between the respective adjacent support holes 156 in a circumferential wall portion of the larger-diameter cage portion 155. The axial direction extended portions 157 are recessed from an outer periphery and are extended in the axial direction to ensure the rigidity of the cage 153.

The ring shaft 82 is placed around the respective planetary rods 83. The ring shaft 82 is arranged from the bottom wall 11 of the cylinder 15 into the piston 18. The ring shaft 82 includes a larger-diameter ring shaft portion 158 located on one end side and a smaller-diameter ring shaft portion 159 continuously and integrally extended from the larger-diameter ring shaft portion 158 to the outer end side. The larger-diameter ring shaft portion 158 is formed to have an outer diameter that is smaller than the inner diameter of the smaller-diameter opening 9b of the cylinder 15. The smaller-diameter ring shaft portion 159 is formed to have an outer diameter that is smaller than the inner diameter of the piston 18. A plurality of locking recesses 162 are formed in one end face of the larger-diameter ring shaft portion 158 to be arranged at intervals in the circumferential direction. Receiving grooves 163 are formed along the circumferential direction in an outer wall surface on one end side of the larger-diameter ring shaft portion 158 to be continuous with receiving grooves 102 provided in the outer wall surfaces of the respective rotation restricting projections 101 of the base plate 100.

The respective rotation restricting projections 101 provided in the base plate 100 are engaged with the respective locking recesses 162 of the larger-diameter ring shaft portion 158. This engagement restricts rotations of the larger-diameter ring shaft portion 158 and the base plate 100 relative to each other. A retaining ring 165 is set in the receiving grooves 163 of the larger-diameter ring shaft portion 158 and in the receiving grooves 102 provided in the respective rotation restricting projections 101 of the base plate 100. The retaining ring 165 is formed in a C shape. The retaining ring 165 is an elastic member that generates a biasing force inward in the radial direction when being expanded. The retaining ring 165 accordingly adheres tightly to bottom faces of the receiving grooves 163 of the larger-diameter ring shaft portion 158 and also adheres to bottom faces of the receiving grooves 102 of the respective rotation restricting projections 101 of the base plate 100, so as to restrict the motions of the larger-diameter ring shaft portion 158 and the base plate 100 relative to each other along the axial direction. A plurality of flow holes 164 are formed in a circumferential wall portion of the larger-diameter ring shaft portion 158 to be pierced along the radial direction and to be arranged at intervals along the circumferential direction. The respective flow holes 164 are formed in a circular shape. The respective flow holes 164 are provided for the flow of brake fluid.

A female threaded portion 167 is formed in an inner wall surface of the smaller-diameter ring shaft portion 159 to be engaged with the respective annular grooves 147 of the first planetary rod portions 148 of the respective planetary rods 83. The conditions of engagement of the annular grooves 147 of the first planetary rod portion 148 of the respective planetary rods 83 with the female threaded portion 167 of the smaller-diameter ring shaft portion 159 are that the pitch of the respective annular grooves 147 of the first planetary rod portions 148 is identical to the pitch of the female threaded portion 167 of the smaller-diameter ring shaft portion 159 and that the number of threads of the female threaded portion 167 is set to be a multiple of the number of the planetary rods 83. For example, there are three planetary rods 83 with the respective annular grooves 147 having the pitch of 1 mm, the female threaded portion 167 of the smaller-diameter ring shaft portion 159 is set to have the pitch of 1 mm and the number of threads of six (3 threads× twofold), i.e., the lead of 6. The second screw engaging portion (outer screw mechanism) 168 between the respective annular grooves 147 of the first planetary rod portions 148 of the respective planetary rods 83 and the female threaded portion 167 of the smaller-diameter ring shaft portion 159 is configured as a reversible screw engaging portion, i.e., as a screw mechanism of a high mechanical efficiency, having a reverse efficiency equal to or higher than zero to revolve the respective planetary rods 83 by the load in the axial direction transmitted from the piston 18 to the adjuster nut 81. The second screw engaging portion 168 is a screw in a reverse direction to that of the first screw engaging portion 126. According to the embodiment, the second screw engaging portion 168 is configured as a left-handed screw, and the first screw engaging portion 126 is configured as a right-handed screw. The second screw engaging portion 168 placed on the outer side of the first screw engaging portion 126 that is a slide screw placed on the inner side in the radial direction in the cylinder 15 is configured by a screw mechanism of the higher mechanical efficiency than that of the first screw engaging portion 126.

The smaller-diameter ring shaft portion 159 is formed to have an outer diameter that is approximately equal to the outer diameter of the pusher portion 122 of the adjuster nut 81. The pusher portion 122 of the adjuster nut 81 is placed in proximity to the other end face of the smaller-diameter ring shaft portion 159. A ring-shaped second thrust bearing 170 is placed to abut on the other end face of the pusher portion 122. The second thrust bearing 170 is configured by a needle bearing. A ring-shaped pusher member 171 is placed to abut on the other end face of the second thrust bearing 170. This second thrust bearing 170 supports the pusher member 171 to be rotatable relative to the adjuster nut 81. Accordingly, the rotational force of the adjuster nut 81 is restricted by the second thrust bearing 170 not to be transmitted to the piston 18. A spherical surface 173 is Rained on an outer periphery of the other end face of the pusher member 171 to abut on the ring-shaped sloped portion 31 provided on the bottom portion 19 of the piston 18. A plurality of flow recesses 174 provided for the flow of brake fluid are formed on an outer wall surface of the pusher member 171 to be arranged at intervals in the circumferential direction. The pusher member 171 is formed to have an outer diameter that is approximately equal to the outer diameter of the second thrust bearing 170 and the outer diameter of the pusher portion 122 of the adjuster nut 81. A insertion hole 171a of the pusher member 171 is formed to have an inner diameter that is approximately equal to the inner diameter of a insertion hole 170a of the second thrust bearing 170 and the inner diameter of the insertion hole 122a of the pusher portion 122 of the adjuster nut 81. According to the embodiment, the second thrust bearing 170 is configured by the needle bearing. This is, however, not essential, but any bearing configured to restrict the rotational force of the adjuster nut 81 to the piston 18 may be employed, for example, a thrust bearing of a ball bearing or tapered roller bearing.

The pusher member 171 and the second thrust bearing 170 are held at the adjuster nut 81 by a bearing holder 176. The bearing holder 176 is formed in a thin-walled cylindrical shape. The bearing holder 176 is formed to have an outer diameter that is approximately equal to the inner diameter of the insertion hole 171a of the pusher member 171, the inner diameter of the insertion hole 170a of the second thrust bearing 170 and the inner diameter of the insertion hole 122a of the pusher portion 122. The bearing holder 176 is provided with a receiving portion 177 that is located on its other end and that is protruded in the radial direction. A plurality of locking pieces 178 are formed in an outer wall surface on one end side of the bearing holder 176 to be arranged at intervals in the circumferential direction. Each locking piece 178 is formed in a rectangular shape such that one end of a peripheral wall of the bearing holder 176 is connected to each locking piece 178, by cutting around the connections. Each locking piece 178 has the other end that is protruded outward in the radial direction.

One end side of the bearing holder 176 (opposite side to the receiving portion 177) is inserted from the other end of the pusher member 171 through the annular space 142 between the screw shaft portion 92 of the spindle rod 80 and the inner wall surface of the insertion hole 171*a* of the pusher member 171, the inner wall surface of the insertion hole 170*a* of the second thrust bearing 170, the inner wall surface of the insertion hole 122*a* of the pusher portion 122 and the inner wall surface of the insertion hole 121*a* of the middle tubular portion 121. Then, while the respective locking pieces 178 of the bearing holder 176 are elastically deformed inward such that the outer wall surfaces of the respective locking pieces 178 are flux with the outer wall surface of the peripheral wall of the bearing holder 176, the outer wall surface of the bearing holder 176 successively abuts on to be inserted through the inner wall surface of the insertion hole 171*a* of the pusher member 171, the inner wall surface of the insertion hole 170*a* of the second thrust bearing 170 and the inner wall surface of the insertion hole 122*a* of the pusher portion 122.

As a result, the receiving portion 177 of the bearing holder 176 abuts on the other end face of the pusher member 171, and one end face of the bearing holder 176 approaches the annular wall surface 135 between the inner wall surface of the insertion hole 121*a* of the middle tubular portion 121 and the inner wall surface of the nut portion 120. In this state, the respective locking pieces 178 are located in the middle tubular portion 121 and are restored such that the other ends of the respective locking pieces 178 are protruded outward in the radial direction, so that the other end faces of the respective locking pieces 178 abut on the annular step 141 between the inner wall surface of the insertion hole 121*a* of the middle tubular portion 121 and the inner wall surface of the insertion hole 122*a* of the pusher portion 122. This bearing holder 176 serves to restrict the motions of the pusher member 171 and the second thrust bearing 170 in the radial direction and to hold the pusher member 171 and the second thrust bearing 170 relative to the adjuster nut 81 while restricting their relative motions in the axial direction.

As shown in FIG. 1, an ECU 210 configured by an electronic control unit serving as a controller to drive and control the electric motor 40 is connected to the electric motor 40. A parking switch 211 that is operated to give an instruction for activating and deactivating the parking brake is connected to the ECU 210. According to a modification, the ECU 210 may be operated in response to a signal from a non-illustrated vehicle, regardless of the operation of the parking switch 211.

The following describes the operations of the disc brake 1*a* according to the embodiment. The operation of the disc brake 1*a* at the time of braking as a general hydraulic brake in response to an operation of a brake pedal (not shown) is described first.

When the driver depresses the brake pedal, a hydraulic pressure corresponding to the pedal force of the brake pedal is supplied from a master cylinder (not shown) through a hydraulic pressure circuit (not shown) to the hydraulic pressure chamber 21 in the caliper 4. Accordingly, the piston 18 moves from its original position at a non-braking time toward the other end side while elastically deforming the piston seal 16, to press the inner brake pad 2 against the disk rotor D. The caliper main body 6 is then moved relative to a bracket toward one end side shown in FIG. 1 by the reaction force of the pressing force of the piston 18, to press the outer brake pad 3 mounted to the claw portion 8 against the disk rotor D. As a result, the disk rotor D is clamped between the pair of inner brake pad 2 and the outer brake pad 3 to produce a frictional force and thereby generate a braking force of the vehicle.

When the driver releases the brake pedal, the supply of the hydraulic pressure from the master cylinder is stopped to lower the hydraulic pressure in the hydraulic pressure chamber 21. Accordingly, the piston 18 is retreated to the original position by the resilience of the elastic deformation of the piston seal 16 to release the braking force. When the movement of the piston 18 is increased accompanied with abrasion of the inner brake pad 2 and the outer brake pad 3 to exceed the limit of the elastic deformation of the piston seal 16, a slippage is caused between the piston 18 and the piston seal 16. This slippage moves the original position of the piston 18 relative to the caliper main body 6. This configuration adjusts the pad clearance to be kept constant even in the case of abrasion of the brake pads 2 and 3.

Figure 4:
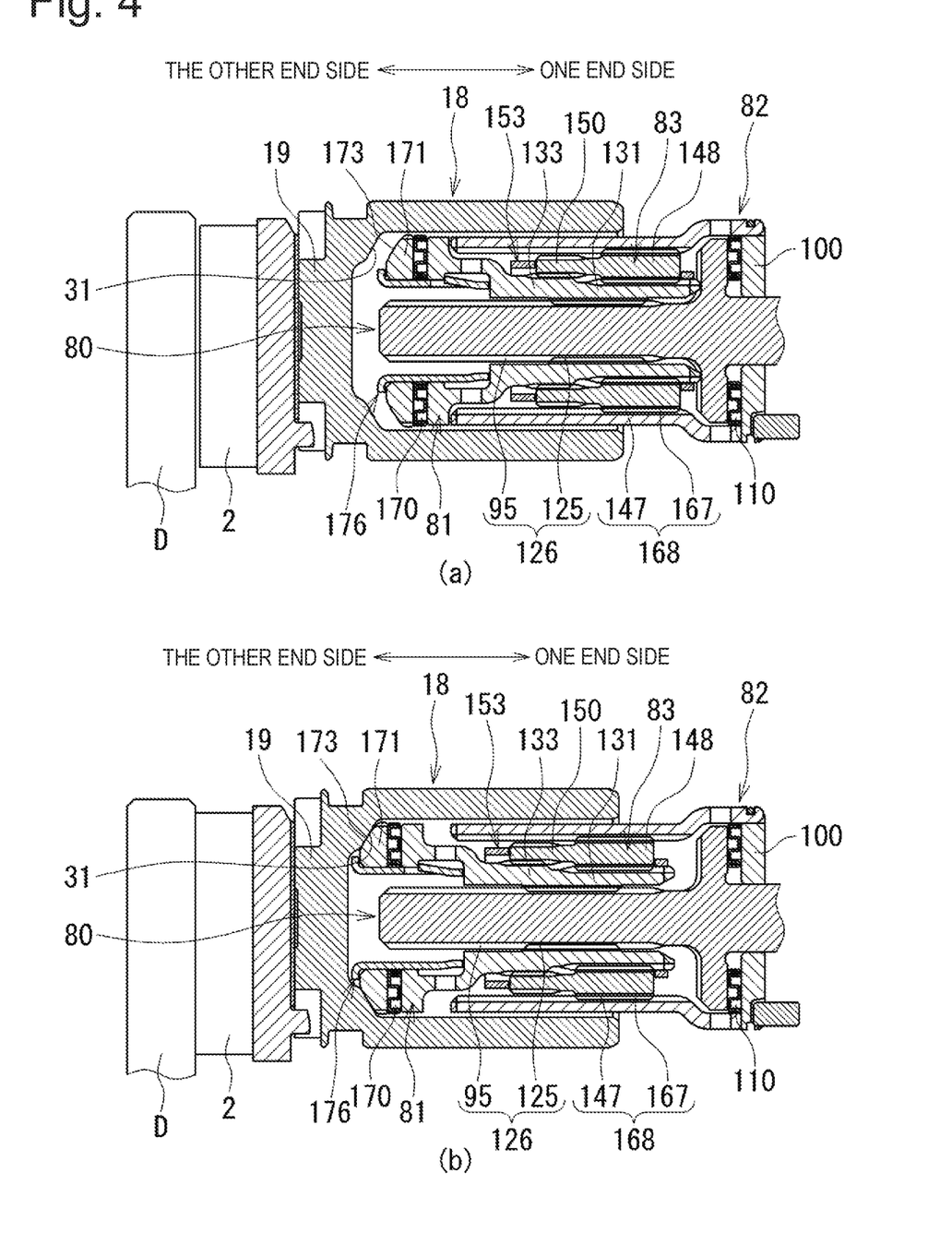
FIG. 4 is sectional views illustrating in a stepwise manner operation to apply a parking brake by the disc brake according to the first embodiment.

The following describes the operation as a parking brake to keep the vehicle at stop with mainly referring to FIG. 4 and appropriately referring to FIGS. 1 to 3. FIG. 4(*a*) and FIG. 4(*b*) show in a stepwise manner the operation to activate (apply) a parking brake.

In the case of activating a parking brake in response to an operation of the parking switch 211 from the deactivated state of the parking brake, the ECU 210 drives the electric motor 40 to rotate the sun gear 57 of the planetary gear speed reducer 45 in an applying direction via the spur gear multistage speed reducer 44. This rotation of the sun gear 57 in the applying direction causes the carrier 62 to be rotated in the applying direction via the respective planetary gears 60. The rotation of the carrier 62, i.e., the rotation of the electric motor 40, is then transmitted to the spindle rod 80.

When the spindle rod 80 is rotated in the applying direction from the state of FIG. 4(*a*), the rotational torque in the applying direction is transmitted to the adjuster nut 81. The rotational torque in the applying direction transmitted to the adjuster nut 81 is then transmitted to the respective planetary rods 83 by gear mesh between the second planetary rod portions 150 of the respective planetary rods 83 and the second sun shaft portion 133 of the adjuster nut 81.

Due to restriction of the motion in the axial direction and the rotation of the ring shaft 82 relative to the base plate 100 supported on the bottom wall 11 of the cylinder 15, the rotational torque in the applying direction transmitted to the respective planetary rods 83 causes relative rotation of the second screw engaging portion 168 between the respective annular grooves 147 of the first planetary rod portions 148 of the respective planetary rods 83 and the female threaded portion 167 of the ring shaft 82. Accordingly, the respective planetary rods 83 move toward the other end side while rotating on their own axes and revolving between the first sun shaft portion 131 and the second sun shaft portion 133 of the adjuster nut 81 and the female threaded portion 167 of the ring shaft 82, and the adjuster nut 81 moves toward the other end side while rotating relative to the spindle rod 80 in the applying direction.

A rotational resistance torque by the operations of the respective planetary rods 83 is applied as the reaction force of the rotational torque from the spindle rod 80, so that the adjuster nut 81 moves toward the other end side while rotating relative to the spindle rod 80. This configuration does not need to provide the piston 18 with an anti-rotation element to provide the linear motion of the adjuster nut 81 and simplifies the inner circumferential shape of the piston 18, thus enhancing the production efficiency of the disc brake.

As a result, as shown in FIG. 4(*b*), the adjuster nut 81 (which is rotating), the respective planetary rods 83 (which are revolving) with the cage 153, the second thrust bearing 170 and the pusher member 171 integrally move toward the bottom portion 19 of the piston 18, and the spherical surface 173 of the pusher member 171 abuts on the ring-shaped sloped portion 31 on the bottom portion 19 of the piston 18. This abutment causes the piston 18 to move forward and causes one end face of the bottom portion 19 of the piston 18 to abut on and press the inner brake pad 2.

At this moment, a total thrust, which is the sum of a thrust generated by the first screw engaging portion 126 between the male threaded portion 95 of the spindle rod 80 and the female threaded portion 125 of the adjuster nut 81 and a thrust generated by the second screw engaging portion 168 between the respective annular grooves 147 of the first planetary rod portions 148 of the respective planetary rods 83 and the female threaded portion 167 of the ring shaft 82, is applied to the piston 18 via the adjuster nut 81.

At the time of applying the thrust to the piston 18, the rotational force of the adjuster nut 81 is restricted by the second thrust bearing 170 not to be transmitted to the piston 18.

According to the embodiment, rotating the spindle rod 80 in the applying direction causes the adjuster nut 81, the respective planetary rods 83, the second thrust bearing 170 and the pusher member 171 to integrally move toward the bottom portion 19 of the piston 18 and abut on the bottom portion 19, and moves the piston 18 toward the other end side to generate a pressing force to the disk rotor D. This configuration enables the original position of the adjuster nut 81 to be adjusted relative to the piston 18 even when the position of the piston 18 relative to the cylinder 11 is changed by abrasion of the pair of inner brake pad 2 and outer brake pad 3 with time.

The ECU 210 drives the electric motor 40 until the pressing force (braking force) from the pair of inner brake pad 2 and outer brake pad 3 to the disk rotor D reaches a predetermined value, for example, until the current value of the electric motor 40 reaches a predetermined value. When detecting that the current value of the electric motor 40 reaches the predetermined value and thereby detecting that the pressing force to the disk rotor D reaches the predetermined value, the ECU 210 stops the power supply to the electric motor 40. This stops the rotation of the spindle rod 80 in the applying direction and thereby stops the rotation of the adjuster nut 81 in the applying direction.

The first screw engaging portion 126 between the male threaded portion 95 of the spindle rod 80 and the female threaded portion 125 of the adjuster nut 81 is configured as the screw engaging portion that is not reversely operated between the spindle rod 80 and the adjuster nut 81 even under application of the reaction force of the pressing force from the disk rotor D as described above. Accordingly, even when the reaction force of the pressing force from the disk rotor D is applied to the adjuster nut 81, this configuration keeps the adjuster nut 81 at stop and holds the piston 18 at the braking position to complete the operation of the parking brake.

The first screw engaging portion (inner screw mechanism) 126 that is the slip screw is provided on the inner side in the radial direction in the cylinder 15 and accordingly has a small effective diameter of the screw. This provides a relatively good positive efficiency, even when the reverse efficiency is equal to or lower than zero. Accordingly, the first screw engaging portion 126 also produces a relatively high thrust. A configuration that a slip screw is provided on the outer side in the radial direction in the cylinder 15, on the other hand, has a large effective diameter of the screw to relatively deteriorate the positive efficiency and produce only a relatively low thrust. The magnitude of the generated thrust affects the thrust kept at stop of the electric motor 18. The configuration that the slip screw is provided on the outer side in the radial direction in the cylinder 15 more significantly lowers the thrust, compared with the configuration that the slip screw is provided on the inner side in the radial direction in the cylinder 15. The configuration that the first screw engaging portion 126 as the slip screw is provided on the inner side in the radial direction in the cylinder 15 suppresses the thrust kept at stop of the electric motor 18 from being lowered and thus efficiently causes the vehicle to be in the parking state.

On completion of the activation of the parking brake, the reaction force of the pressing force from the disk rotor D is transmitted to the bottom wall 11 of the cylinder 15 via the pusher member 171, the second thrust bearing 170, the adjuster nut 81, the spindle rod 80, the first thrust bearing 110 and the base plate 110, to serve as a force for retaining the piston 18.

In the case of deactivating (releasing) the parking brake, in response to a parking deactivating operation of the parking switch 211, the ECU 210 returns the piston 18, more specifically, drives and rotates the electric motor 40 in a releasing direction to separate the piston 18 from the disk rotor D. This rotates the spur gear multistage speed reducer 44 and the planetary gear speed reducer 45 in the releasing direction of returning the piston 18 and the rotation thereof is transmitted to the spindle rod 80 via the carrier 62.

Rotating the spindle rod 80 in the releasing direction causes reverse operations reverse to the operations accompanied with the rotation in the applying direction described above. The rotational torque in the releasing direction is transmitted to the respective planetary rods 83 via the adjuster nut 81. The rotational torque in the releasing direction transmitted to the respective planetary rods 83 causes relative rotation of the second screw engaging portion 168 between the respective annular grooves 147 of the first planetary rod portions 148 of the respective planetary rods 83 and the female threaded portion 167 of the ring shaft 82. Accordingly, the respective planetary rods 83 move toward one end side while rotating on their own axes and revolving between the first sun shaft portion 131 and the second sun shaft portion 133 of the adjuster nut 81 and the female threaded portion 167 of the ring shaft 82, and the adjuster nut 81 moves toward one end side while rotating relative to the spindle rod 80 in the releasing direction.

As a result, the adjuster nut 81 (which is rotating), the respective planetary rods 83 (which is revolving) with the cage 153, the second thrust bearing 170 and the pusher member 171 integrally move toward one end side to be separated from the bottom portion 19 of the piston 18, and the spherical surface 173 of the pusher member 171 is separated from the ring-shaped sloped portion 31 on the bottom portion 19 of the piston 18. The ECU 210 controls the electric motor 40 to stop the electric motor 40 when the spherical surface 173 of the adjuster nut 81 reaches an initial position to have a predetermined distance from the ring-shaped sloped portion 31 on the bottom portion 19 of the piston 18. Finally, the piston 18 is retreated to the original position by the resilience of the elastic deformation of the piston seal 16 to completely release the braking force.

At the releasing time described above, the adjuster nut 81 moves toward one end side while rotating relative to the spindle rod 80. The respective locking concaves 143 provided on one end face of the adjuster nut 81 are engaged with the radially extended respective locking projections 96 provided on the other end face of the disk portion 90 of the spindle rod 80 to restrict their relative rotation. This configuration suppresses the female threaded portion 125 of the adjuster nut 81 from being excessively screwed into the male threaded portion 95 of the spindle rod 80.

As described above, the disc brake 1a according to the first embodiment employs the configuration that causes relative rotation of the second screw engaging portion 168 between the respective annular grooves 147 of the first planetary rod portions 148 of the respective planetary rods 83 and the female threaded portion 167 of the ring shaft 82 by the rotational torque from the electric motor 40, so as to rotate the adjuster nut 81 relative to the spindle rod 80 and move the adjuster nut 81 in the axial direction, in the course of activating and deactivating the parking brake. This configuration does not need a large number of components unlike the prior art configuration and thereby achieves the simpler structure with the less number of components.

Figure 5:
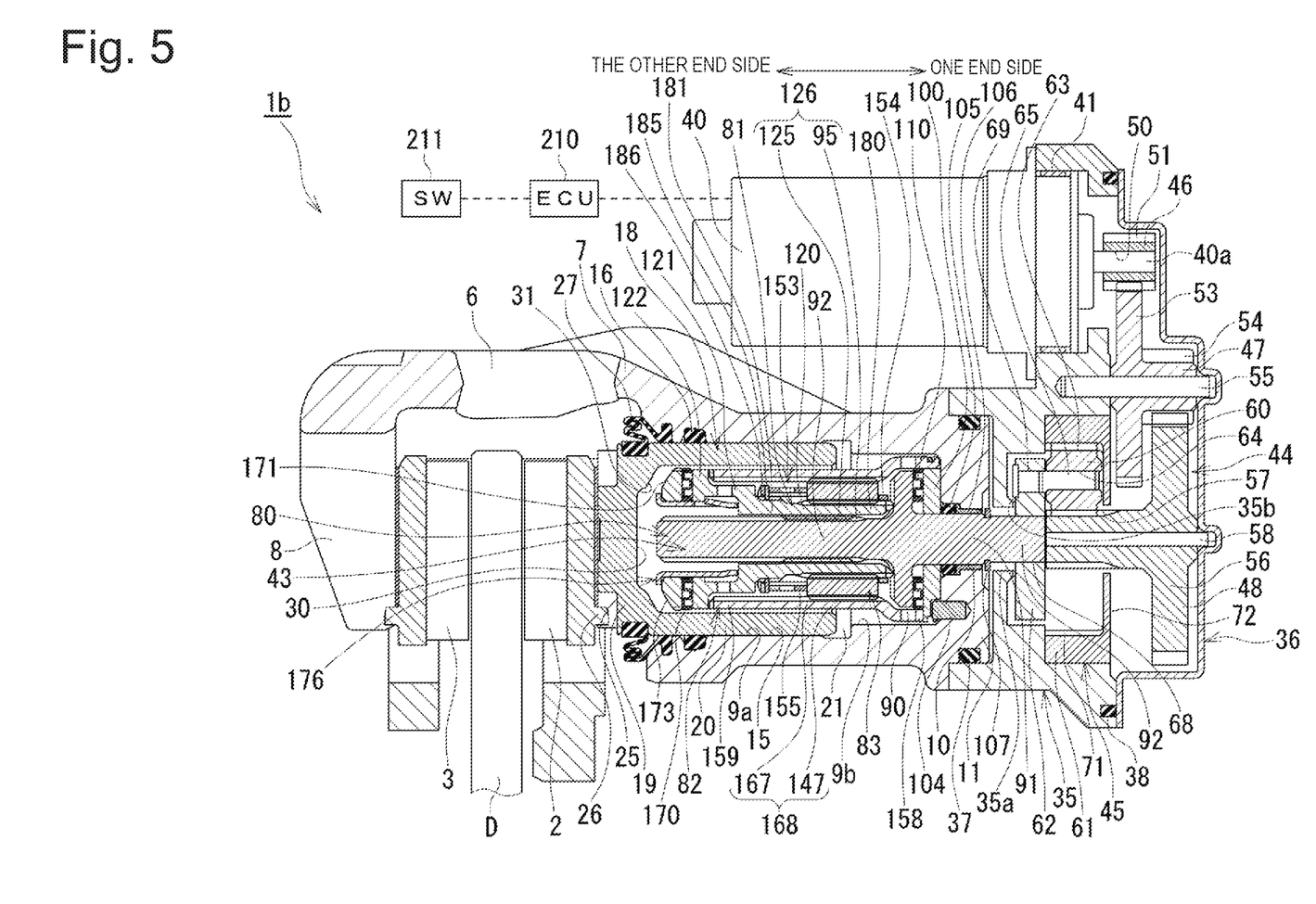
FIG. 5 is a sectional view illustrating a disc brake according to a second embodiment.
Figure 6:
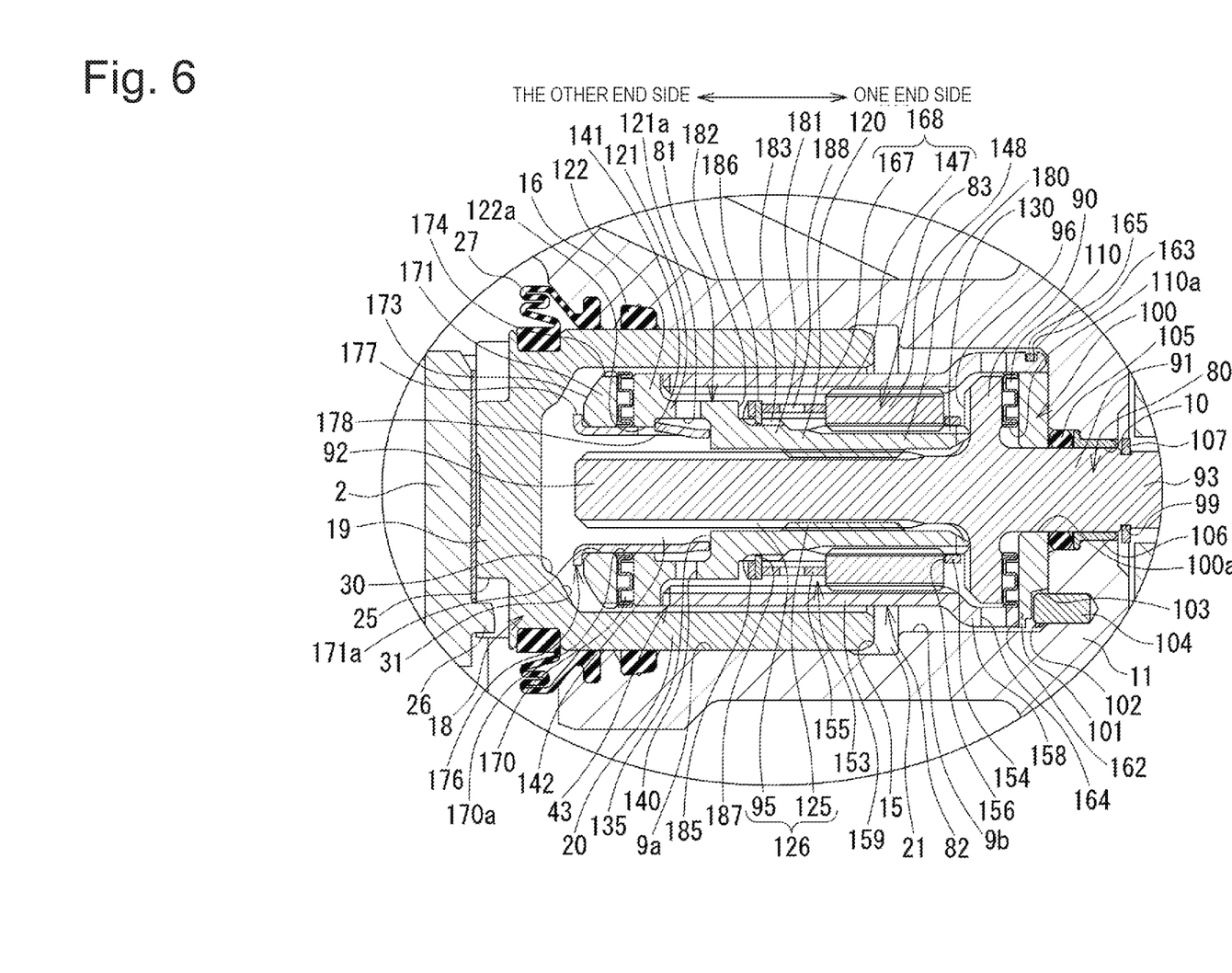
FIG. 6 is an enlarged sectional view illustrating a piston driving mechanism employed for the disc brake according to the second embodiment.
Figure 7:
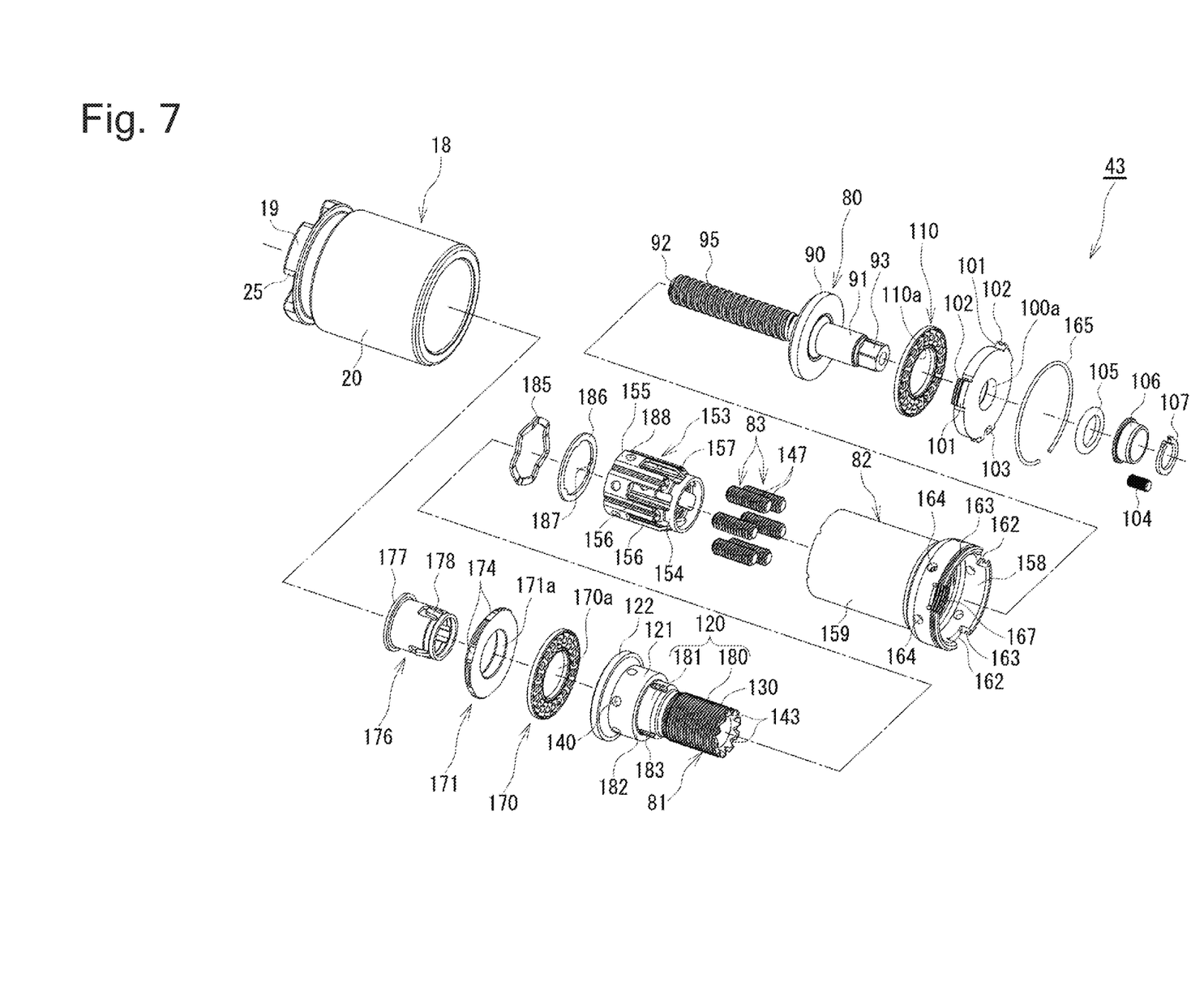
FIG. 7 is an exploded perspective view illustrating the piston driving mechanism employed for the disc brake according to the second embodiment.

The following describes a disc brake 1b according to a second embodiment with reference to FIGS. 5 to 7. Only differences from the disc brake 1a according to the first embodiment are described with regard to the disc brake 1b according to the second embodiment.

A nut portion 120 of an adjuster nut 81 includes a sun shaft portion 180 with a plurality of annular grooves 130 that are formed in an outer wall surface on one end side and that are arranged in the axial direction, and a support shaft portion 181 with a plurality of support longitudinal grooves 183 that are formed in an outer wall surface on the other end side, that are extended along the axial direction, and that are arranged at intervals in the circumferential direction. The support shaft portion 181 is formed to have an outer diameter that is larger than the outer diameter of the sun shaft portion 180. A ring-shaped support surface 182 is formed between an outer wall surface of a middle tubular portion 121 and an outer wall surface of the support shaft portion 181. Each of a planetary rod 83 has a plurality of annular grooves 147 that are formed on an outer wall surface thereof and that are arranged over the entire region in the axial direction. The respective annular grooves 147 of the respective planetary rods 83 are engaged with the respective annular grooves 130 of the sun shaft portion 180 of the adjuster nut 81. A wave spring washer 185 serving as a biasing member is placed to abut on the ring-shaped support surface 182 of the adjuster nut 81.

A ring-shaped spring sheet 186 is placed to abut on one end face of the wave spring washer 185 and to abut on the other end face of a cage 153. A plurality of projections 187 are formed on an inner wall surface of the spring sheet 186 to be arranged at intervals in the circumferential direction. The respective projections 187 of the spring sheet 186 are engaged with the support longitudinal grooves 183 of the support shaft portion 181 of the adjuster nut 81. The spring sheet 186 is supported to be not rotatable relative to the adjuster nut 81 and serves to suppress the rotational torque from the cage 153 from being transmitted to the wave spring washer 185. The wave spring washer 185 is formed to have an outer diameter that is approximately equal to the outer diameter of the spring sheet 186 and the outer diameter of the middle tubular portion 121 of the adjuster nut 81 and that is larger than the outer diameter of a larger-diameter cage portion 155 of the cage 153. A plurality of flow holes 188 are pierced along the radial direction in a circumferential wall portion of the larger-diameter cage portion 155 of the cage 153 to be arranged at intervals in the circumferential direction. The respective flow holes 188 are located on the other end side of respective support holes 156. The flow holes 188 are formed in an approximately circular shape. The respective flow holes 188 are provided for the flow of brake fluid. The disc brake 1b of the second embodiment employs the wave spring washer 185. This is, however, not essential, but any biasing member configured to apply a biasing force in the axial direction, such as a coil spring, may alternatively be employed.

The respective planetary rods 83 are rotatably supported by the respective support holes 156 of the cage 153. The cage 153 is biased toward one end side by the biasing force of the wave spring washer 185, so as to cause the respective support holes 156 to abut on the other end faces of the respective planetary rods 83 and to increase the rotational resistance torque of an engaging portion between the respective annular grooves 147 of the respective planetary rods 83 and the respective annular grooves 130 of the sun shaft portion 180 of the adjuster nut 81. This configuration enables the rotational torque from the adjuster nut 81 to be transmitted to the respective planetary rods 83. At the applying time, the reaction force along the axial direction from the disk rotor D increases the rotational resistance torque between the respective planetary rods 83 and the sun shaft portion 180 of the adjuster nut 81. The wave spring washer 185 may accordingly have a relatively small biasing force.

In the disc brake 1a according to the first embodiment, the rotational torque from the adjuster nut 81 is transmitted to the respective planetary rods 83 by gear mesh between the second planetary rod portions 150 of the respective planetary rods 83 and the second sun shaft portion 133 of the adjuster nut 81. In the disc brake 1b according to the second embodiment, on the other hand, the rotational torque from the adjuster nut 81 is transmitted to the respective planetary rods 83 by rotation resistance between the respective planetary rods 83 and the sun shaft portion 180 of the adjuster nut 81. Accordingly, the disc brake 1b according to the second embodiment employs neither the second planetary rod portions 150 of the respective planetary rods 83 nor the second sun shaft portion 133 of the nut portion 120 of the adjuster nut 81, which are employed in the disc brake 1a according to the first embodiment, but employs the wave spring washer 185 and the spring sheet 186 and thus enhances the production efficiency and the assembling efficiency, compared with the disc brake 1a according to the first embodiment.

Figure 8:
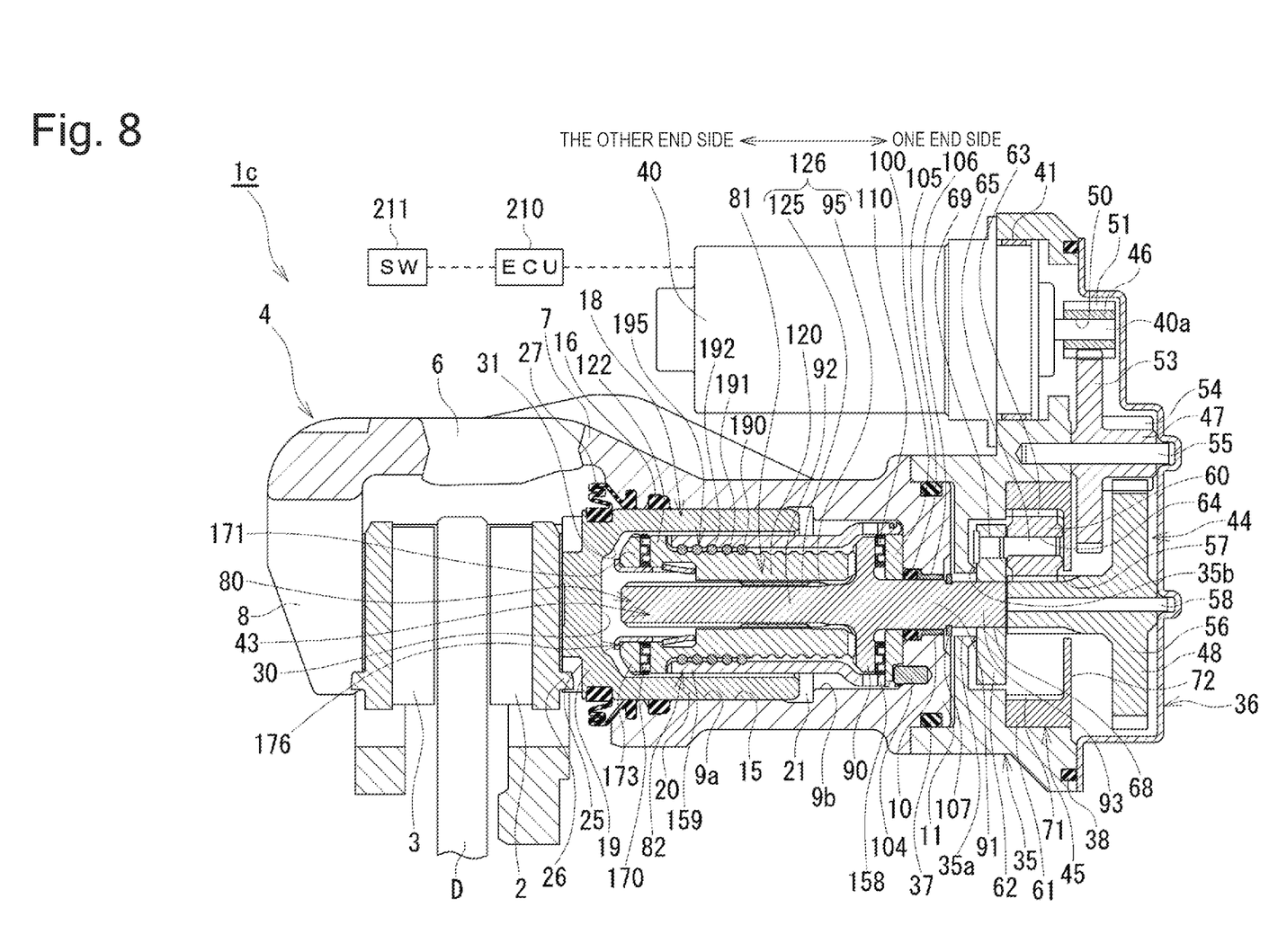
FIG. 8 is a sectional view illustrating a disc brake according to a third embodiment.

The following describes a disc brake 1c according to a third embodiment with reference to FIG. 8. Only differences from the disc brake 1a according to the first embodiment are described with regard to the disc brake 1c according to the third embodiment.

An adjuster unit 81 includes a nut portion 120 that is screwed to a spindle rod 80 and a ring-shaped pusher portion 122 that is integrally provided to be continuous from the nut portion 120 toward the other end side. The pusher portion 122 is formed to have an outer diameter that is larger than the outer diameter of the nut portion 120. A ball groove 190 is formed in a spiral shape in an outer wall surface of the nut portion 120 over the entire region in the axial direction. A ball groove 191 is formed in a spiral shape in an inner wall surface on the other end side of a smaller-diameter ring shaft portion 159 of a ring shaft 82. A plurality of balls 192 as rolling elements are placed between the ball groove 190 of the nut portion 120 and the ball groove 191 of the ring shaft 82. This forms a ball screw engaging portion 195 that is an outer screw mechanism, which is a screw in a reverse direction to that of the first screw engaging portion 126 that is the inner screw mechanism, and is configured as a left-handed screw according to the embodiment. Whereas the first screw engaging portion 126 that is the inner screw mechanism is configured as a slide screw, the ball screw engaging portion 195 that is the outer screw mechanism is configured as a screw mechanism of the higher mechanical efficiency than the slide screw.

In the disc brake 1c according to the third embodiment, rotating the spindle rod 80 and applying the rotational torque to the adjuster nut 81 provides relative rotation of the ball screw engaging portion 195 between the adjuster nut 81 and the ring shaft 82 and applies the rotational resistance torque to the adjuster nut 81. This causes the adjuster nut 81 to move in the axial direction while rotating relative to the spindle rod 80. In the disc brake 1c according to the third embodiment, at the applying time, a total thrust, which is the sum of a thrust generated by the first screw engaging portion 126 between the male threaded portion 95 of the spindle rod 80 and the female threaded portion 125 of the adjuster nut 81 and a thrust generated by the ball screw engaging portion 195 between the adjuster nut 81 and the ring shaft 82, is applied to the piston 18 via the adjuster nut 81.

The disc brake 1c according to the third embodiment described above does not employs the plurality of planetary rods 83, which are employed in the disc brakes 1a and 1b according to the first and the second embodiments but employs the ball screw engaging portion 195 between the nut portion 120 of the adjuster nut 81 and the ring shaft 82 and accordingly further enhances the production efficiency and the assembling efficiency, compared with the disc brakes 1a and 1b according to the first and the second embodiments.

The disc brakes 1a to 1c according to the first to the third embodiments employ the spur gear multistage speed reducer 44 and the planetary gear speed reducer 45 as the speed reduction mechanisms. Another known speed reduction mechanism, for example, a cycloidal speed reducer or a wave gear speed reducer, may be employed.

According to the embodiments, the operations of the piston driving mechanism 43 are described with regard to the parking brake as an example of the function to keep the vehicle at stop. The piston driving mechanism 43 serving as the parking brake mechanism may be operated in situations other than the parking brake, for example, in the case of hill start assist or downhill assist to assist starting the vehicle on a slope or at the time of auto stop when the vehicle is at stop in an accelerator-off position.

As the disc brakes based on the embodiment described above may be the following aspects, for example.

According to a first aspect, there is provided a disc brake. This disc brake includes a piston configured to move one of a pair of pads, which are placed across a rotor on respective sides in an axial direction of the rotor, in the axial direction of the rotor; a caliper main body including a cylinder win which the piston is placed in a protrudable manner; an electric motor provided on the caliper main body; and a piston driving mechanism provided in the cylinder of the caliper main body and configured to drive the piston. The piston driving mechanism includes an input member placed to be extended in the cylinder in a protruding direction of the piston, including a threaded portion formed on a circumferential surface of the input member, and configured to be rotated with transmission of a torque from the electric motor; a tubular rotation linear motion member including an engaging threaded portion engaged with the threaded portion of the input member, and configured to move in an axial direction of the cylinder by rotation of the input member to transmit a torque of the electric motor to the piston; a tubular support member supported on the caliper main body to be not rotatable and placed on an outer side in a radial direction with respect to the rotation linear motion member; and a rolling element placed between the support member and the rotation linear motion member to be engaged with the support member and the rotation linear motion member, and configured to, when the rotation linear motion member is rotated by rotation of the input member, apply a rotational resistance to the rotation linear motion member and linearly move the rotation linear motion member while rotating the rotation linear motion member relative to the input member.

According to a second aspect, in the first aspect, the rolling element is a rolling shaft that is engaged with an outer circumferential surface of the rotation linear motion member to be not relatively movable along the axial direction, and the outer circumferential surface of the rolling shaft is screw-engaged with an inner circumferential surface of the support member.

According to a third aspect, in the second aspect, the outer circumferential surface of the rolling shaft is gear-meshed with the outer circumferential surface of the rotation linear motion member.

According to a fourth aspect, in the second aspect, the disk brake further includes a biasing member configured to bias the rolling shaft along the axial direction so as to increase a rotational resistance torque of an engaging portion between the rolling shaft and the rotation linear motion member.

According to a fifth aspect, in the first aspect, the rolling element is a ball placed between a ball groove that is provided in an inner wall surface of the support member and that is extended in a spiral form and a ball groove that is provided in an outer circumferential surface of the rotation linear motion member and that is extended in a spiral form.

According to a sixth aspect, there is provided a disc brake. This disc brake includes a caliper main body including a piston configured to press a pad against a rotor, and a cylinder bore formed such that the piston is movably placed therein; an electric motor mounted to the caliper main body; and a piston driving mechanism provided in the cylinder bore and configured to drive the piston by a torque of the electric motor. The piston driving mechanism includes two screw mechanisms provided on an inner side and on an outer side in a radial direction of the cylinder bore and configured to convert rotation by the torque of the electric motor into linear motion. The screw mechanism on the outer side has a higher mechanical efficiency than the screw mechanism on the inner side.

According to a seventh aspect, in the sixth aspect, the screw mechanism on the inner side and the screw mechanism on the outer side move the piston by rotation of the electric motor. When rotation of the electric motor is stopped, the screw mechanism on the inner side keeps the piston at a predetermined position.

According to an eighth aspect, in the sixth aspect or in the seventh aspect, the piston driving mechanism includes a shaft member configured to rotate by the torque of the electric motor; a tubular member including an inner circumferential surface and configured to linearly move with screw engagement of the inner circumferential surface with the shaft member; and a fixation member fixed to the caliper main body to be not rotatable and configured to have screw engagement with an outer circumferential surface of the tubular member. The screw mechanism on the inner side is formed on the shaft member and on the tubular member. The screw mechanism on the outer side is formed on the tubular member and on the fixation member. The screw mechanism on the outer side applies a rotational resistance force to the tubular member.

According to a ninth aspect, in any of the sixth to the eighth aspects, the disk brake includes a thrust bearing configured to suppress transmission of a rotational force of the tubular member to the piston is placed between the tubular member and the piston.

According to a tenth aspect, in any of the sixth to the ninth aspects, the screw mechanism on the outer side includes a rolling element that is placed between the fixation member and the tubular member to be engaged with the fixation member and the tubular member and that is configured to, when the tubular member is rotated by rotation of the shaft member, apply a rotational resistance to the tubular member and linearly move the tubular member while rotating the tubular member relative to the shaft member.

The foregoing describes some embodiments of the present invention. Such embodiments of the present invention described above are, however, for the purpose of facilitating the understanding of the present invention and are not intended to limit the present invention. The present invention may be changed, altered and modified without departing from the spirit of the invention and includes equivalents thereof. In the scope of solving at least part of the problems described above or in the scope of achieving at least part of the advantageous effects, any combination or omission of any of the respective components described in the claims and in the specification hereof may be allowed.

The present application claims priority to Japanese patent application No. 2016-127898 filed on Jun. 28, 2016. The entirety of the disclosure including the specification, the claims, the drawings and the abstract of Japanese patent application No. 2016-127898 filed on Jun. 28, 2016 is incorporated herein by reference in its entirety.

REFERENCE SIGNS LIST 1a, 1b, 1c disc brakes, 2 inner brake pad, 3 outer brake pad, 4 caliper, 6 caliper main body, 7 cylinder portion, 15 cylinder, 18 piston, 19 bottom portion, 40 electric motor, 43 piston driving mechanism, 80 spindle rod (input member, shaft member), 81 adjuster nut (rotation linear motion member, tubular member), 82 ring shaft (support member, fixation member), 83 planetary rod (rolling element, rolling shaft), 95 male threaded portion (spindle rod), 125 female threaded portion (engagement portion, adjuster nut), 126 first screw engaging portion, 130 annular grooves (adjuster nut), 131 first sun shaft portion, 132 longitudinal grooves (adjuster nut), 133 second solar shaft portion, 147 annular grooves (planetary rod), 148 first planetary rod portion, 149 longitudinal grooves (planetary rod), 150 second planetary rod portion, 167 female threaded portion (ring shaft), 168 second screw engaging portion, 170 second thrust bearing (thrust bearing), 185 wave spring washer (biasing member), 190 ball groove (adjuster nut), 191 ball groove (ring shaft), 192 ball (rolling element), D disk rotor

The invention claimed is:
1. A disc brake comprising:
a piston configured to move one of a pair of pads, which are placed across a rotor on respective sides in an axial direction of the rotor, in the axial direction of the rotor;
a caliper main body including a cylinder in which the piston is placed in a protrudable manner;
an electric motor provided on the caliper main body; and
a piston driving mechanism provided in the cylinder of the caliper main body and configured to drive the piston, wherein
the piston driving mechanism includes:
an input member placed to be extended in the cylinder in a protruding direction of the piston, including a threaded portion formed on a circumferential surface of the input member, and configured to be rotated with transmission of a torque from the electric motor;
a tubular rotation linear motion member including an engaging threaded portion engaged with the threaded portion of the input member, and configured to move in an axial direction of the cylinder by rotation of the input member to transmit a torque of the electric motor to the piston;
a tubular support member supported on the caliper main body to be not rotatable, and placed on an outer side in a radial direction with respect to the rotation linear motion member; and
a rolling element placed between the support member and the rotation linear motion member to be engaged with the support member and the rotation linear motion member, and configured to, when the rotation linear motion member is rotated by rotation of the input member, apply a rotational resistance to the rotation linear motion member and linearly move the rotation linear motion member while rotating the rotation linear motion member relative to the input member.

2. The disc brake according to claim 1, wherein the rolling element is a rolling shaft that is engaged with an outer circumferential surface of the rotation linear motion member to be not relatively movable along the axial direction, and the outer circumferential surface of the rolling shaft is screw-engaged with an inner circumferential surface of the support member.

3. The disc brake according to claim 2, wherein the outer circumferential surface of the rolling shaft is gear-meshed with the outer circumferential surface of the rotation linear motion member.

4. The disc brake according to claim 2, further comprising:
a biasing member configured to bias the rolling shaft along the axial direction so as to increase a rotational resistance torque of an engaging portion between the rolling shaft and the rotation linear motion member.

5. The disc brake according to claim 1, wherein the rolling element is a ball placed between a ball groove that is provided in an inner wall surface of the support member and that is extended in a spiral form and a ball groove that is provided in an outer circumferential surface of the rotation linear motion member and that is extended in a spiral form.

* * * * *